Patented June 24, 1941

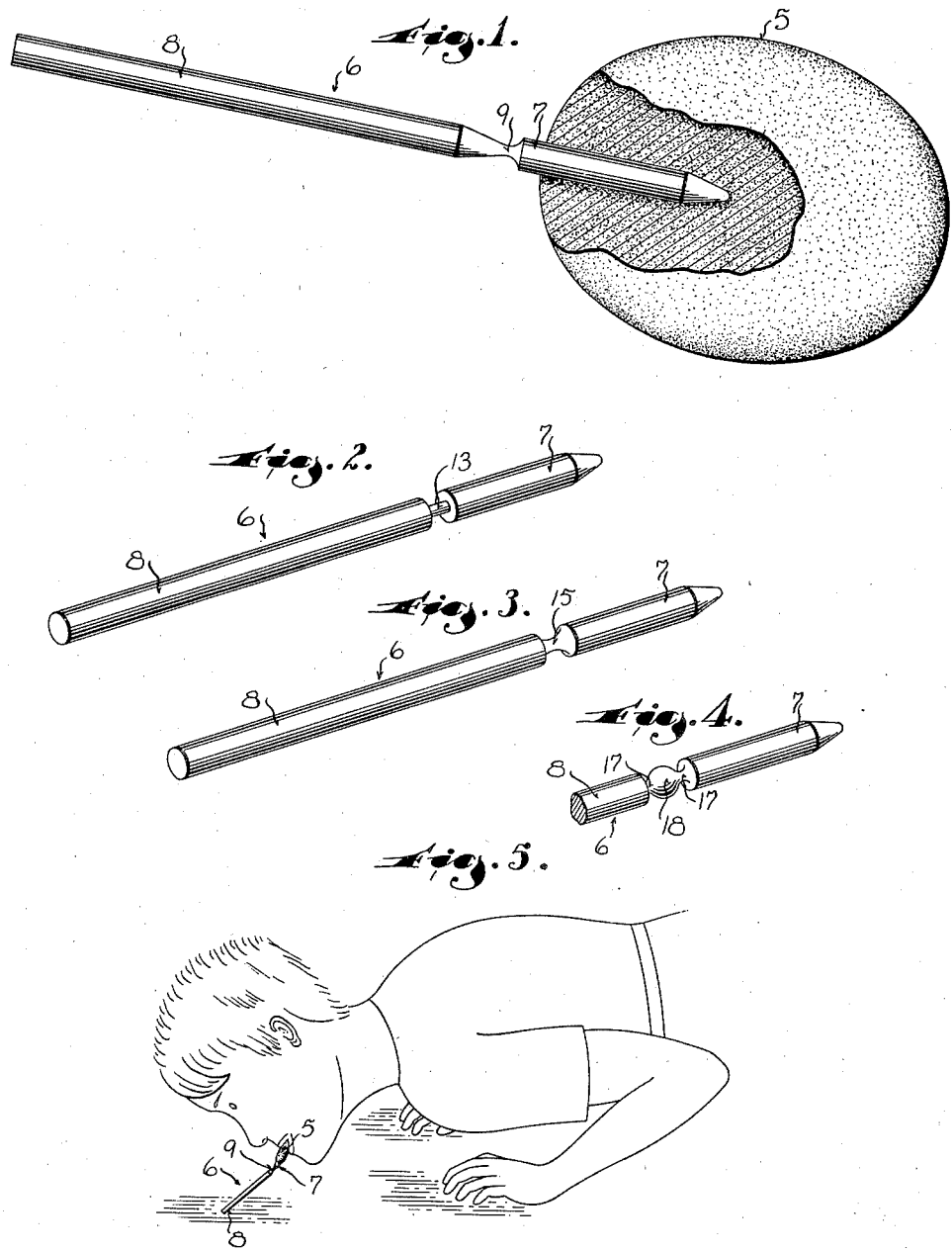

2,246,778

UNITED STATES PATENT OFFICE 2,246,778

SAFETY HANDLE FOR CONFECTIONS

Edward E. Cahoon, Racine, Wis.

Application December 21, 1939, Serial No. 310,418

4 Claims. (Cl. 99—138)

This application is a continuation in part of the copending application of Edward E. Cahoon, Serial No. 230,023, filed September 15, 1938, and relates to lollipops and other similar confections, and refers more particularly to an improved handle therefor.

Heretofore, lollipops and other confections of this type were provided with rigid wooden sticks which were embedded in the body of the confection so that the projecting end of the stick formed a handle therefor.

While this construction provided adequate means for a user to hold the confection, the problem of injury to children, among whom this type of confection is extremely popular, was always present. Completely unaware of danger, children oftentimes disregarded the handle of the confection preferring to hold the same in their mouths while concentrating all of their attention upon games or other forms of amusement. Inasmuch as these amusements generally include running, climbing or jumping, the consequent danger of a child falling while holding a confection in his mouth with the handle protruding is evident.

Instances in which the interior of the child's mouth or throat has been seriously injured due to falling while unthinkingly romping with the confection in his mouth unattended are numerous. Obviously, the danger of injury to the mouth or throat is multiplied in the event pieces of the confection, which is usually hard, have been bitten off and leave sharp edges protruding therefrom.

With a view toward overcoming these dangers, this invention contemplates providing lollipops or other similar confections with a handle so designed as to render the use of these confections by children non-injurious.

More specifically, it is an object of this invention to provide lollipops or other like confections with a handle having a weakened or frangible safety portion exteriorly of the confection adapted to give way and separate the handle from the confection itself upon the application of any lateral force on the handle so as to prevent the application of endwise force on the confection or embedded part of the handle.

A further object of this invention is to provide a handle for lollipops and like confections, which is breakable upon the application of force thereon and which does not require special machinery for insertion thereof into the confection in the manufacture of the confection.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates several complete examples of the physical embodiment of the invention constructed in accordance with the best modes so far devised for the practical application of the principles thereof, and in which:

Figure 1 is an enlarged view of a lollipop with parts thereof broken away to show the application of the improved handle thereto;

Figure 2 is a perspective view of a modified form of handle;

Figures 3 and 4 are views similar to Figure 2 illustrating further modified forms of handle;

Figure 5 is a view illustrating the manner in which the handle is broken off and separated from the body of the confection upon the application of force on the handle as when a child, having a lollipop in its mouth, falls.

Referring now particularly to the accompanying drawing, in which like numerals indicate like parts, the numeral 5 designates a lollipop or other confection having a handle 6. The handle 6 is preferably a round stick with one end 7 embedded or molded into the body of the lollipop. The remaining portion 8 of the handle, which projects from the lollipop, as is customary, provides means by which the confection may be held.

The handle 6 is preferably formed of wood and between its portions 7 and 8 it is weakened through the provision of a tapered neck 9. At its point of smallest cross section, the neck 9 is considerably smaller in diameter than the other portions of the handle, while the opposite ends of the neck which connect with the adjacent ends of the sections 7 and 8 of the stick taper outwardly to a diameter equal to that of the stick. The neck 9 is formed by grooving the stick circumferentially, but has sufficient strength to permit inserting the handle 6 into the body of the lollipop in the customary manner with machines now in use for that purpose.

Machines now in use, to insert sticks into the candy, require only that the stick be substantially uniform in diameter throughout its length; and inasmuch as the handle 6 with the exception of its reduced frangible portion between its sections 7 and 8, is substantially uniform diameter, it is obvious that no special machinery is required in the manufacture of lollipops utilizing the handle of the present invention.

As shown in Figure 5, the application of force on the handle acts to sever the connection between the sections 7 and 8. It is therefore obvious that should a child fall or bump against the handle while holding the lollipop in his mouth, that the resultant breakage at the neck 9, which separates the handle from the body of the lollipop, substantially precludes the possibility of injury resulting to the child by preventing the application of endwise force on the confection or embedded portion 7.

It is important to note that the neck 9 is circular in cross section and coaxial with the sections 7 and 8 of the stick. Preferably, the neck has a diameter at its smallest point not exceeding the radius of the end sections 7 and 8. Thus it will be seen that the neck is readily broken upon the application of lateral force from any direction on either end of the stick while the other end is maintained substantially stationary.

The modified embodiments of the invention shown in Figures 2 and 3 are substantially like that shown in Figure 1, the only difference being in the specific formation of the weakened necks. In the construction of Figure 2, the frangible portion consists of a coaxial neck 13 of uniform diameter throughout its length as distinguished from the construction of Figure 1 in which the neck tapers.

In Figure 3, the frangible neck 15, is of the same general type as illustrated in Figures 1 and 2, but has its point of smallest cross section centrally thereof, with its opposite ends filleting symmetrically into the adjacent ends of the sections 7 and 8.

If desired, the stick may be provided with two frangible necks 17 separated by a substantially spherical portion 18 as shown in Figure 4. The necks 17 are of the same proportions at their smallest points as is the neck 15 of the stick illustrated in Figure 3, while the spherical portion 18 is enlarged to a diameter not exceeding the diameter of the end sections 7 and 8.

In this embodiment of the invention as in the others, the diameter of either neck at its smallest point does not exceed the radius of the end sections 7 and 8 of the stick, which thereby insures ready breakage at either neck.

In all embodiments shown, breakage at the reduced neck is assured upon the application of lateral force or bending stress on the stick in any direction whatever, for it is to be seen that the necks are of the same thickness at any two cross axial planes normal to one another. Thus the force required to break the neck is the same regardless of from which direction the force is applied.

From the foregoing description taken in connection with the accompanying drawing, it will be apparent to those skilled in the art that this invention affords a novel handle for lollipops or like confections through the use of which a very serious danger of injury to the user is completely eliminated, and that this improvement can be utilized without entailing the provision of special machinery for the manufacture of the confections.

What I claim as my invention is:

1. A safety stick confection comprising: a mass of solidified confection, and a stick, one end portion of which stick constitutes a handle when the other end portion thereof is embedded in the mass of the confection, both of said end portions being of substantially the same cross section and integrally united with one another by an interposed, relatively weak safety portion, so positioned in the length of the stick as to be exterior of such mass of confection, said safety portion being of less cross section than said end portions and of the same thickness at any two cross axial planes normal to one another.

2. A safety stick sucker comprising: a mass of solidified confection; a safety stick having one end portion thereof embedded in said mass and the other end portion projecting exteriorly of the mass and constituting a handle therefor, both of said end portions being of substantially the same cross section and integrally united with one another externally of the mass of confection by an interposed relatively weak safety portion of less cross section than said end portions and of the same thickness at any two cross axial planes normal to one another, whereby said stick will break externally of the mass of said confection when said projecting portion of the stick is subjected to breaking strains from any lateral direction.

3. A safety stick sucker comprising: a mass of solidified confection; a safety stick having one end portion thereof embedded in said mass and the other end portion projecting exteriorly of the mass and constituting a handle therefor, both of said end portions being substantially cylindrical and of substantially the same diameter and integrally united with one another by an interposed relatively weak safety portion of circular cross section of less radius than said end portions and positioned to break exteriorly of the mass of confection when said projecting portion of the stick is subjected to breaking strains from any lateral direction.

4. A safety stick confection comprising: a mass of solidified confection, an elongated substantially cylindrical wooden stick having one end portion adapted to be embedded in the solidified mass of confection so that its opposite end portion which projects from the confection forms a handle therefor, said stick having a circumferential groove therein so positioned as to be outside and adjacent to the body of the confection providing a relatively weak substantially coaxial neck circular in cross section and of a diameter at its smallest point not exceeding the radius of the cylindrical end portion of the stick whereby the stick is readily broken externally of the confection at said neck upon the application of lateral force from any direction on the handle portion so as to preclude the application of endwise force on the embedded portion.

EDWARD E. CAHOON.